United States Patent
Hayakawa

(10) Patent No.: US 11,252,292 B2
(45) Date of Patent: Feb. 15, 2022

(54) DOCUMENT SCANNER AND IMAGE FORMING APPARATUS

(71) Applicant: Brother Kogyo Kabushiki Kaisha, Nagoya (JP)

(72) Inventor: Atsushi Hayakawa, Okazaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/795,659

(22) Filed: Feb. 20, 2020

(65) Prior Publication Data

US 2020/0288028 A1  Sep. 10, 2020

(30) Foreign Application Priority Data

Mar. 7, 2019 (JP) .............................. JP2019-041817

(51) Int. Cl.
*H04N 1/00* (2006.01)

(52) U.S. Cl.
CPC ..... *H04N 1/00564* (2013.01); *H04N 1/00315* (2013.01); *H04N 1/00496* (2013.01)

(58) Field of Classification Search
None
See application file for complete search history.

(56) References Cited

U.S. PATENT DOCUMENTS

| | | | | |
|---|---|---|---|---|
| 5,513,922 A | * | 5/1996 | Umbach | B41J 3/46 347/222 |
| 9,058,079 B1 | * | 6/2015 | Schneider | H04B 5/0031 |
| 9,288,355 B2 | * | 3/2016 | Naka | H04N 1/00307 |
| 9,661,185 B2 | * | 5/2017 | Yokoyama | H04L 63/0861 |
| 10,062,224 B2 | * | 8/2018 | Cojocaru | G07C 9/23 |
| 10,187,550 B2 | * | 1/2019 | Kosaka | H04N 1/00344 |
| 2003/0043406 A1 | * | 3/2003 | Wells | H04N 1/00278 358/1.15 |
| 2003/0061344 A1 | * | 3/2003 | Monroe | H04L 69/329 709/224 |
| 2004/0227979 A1 | * | 11/2004 | Chen | H04N 21/43637 358/474 |

(Continued)

FOREIGN PATENT DOCUMENTS

| | | |
|---|---|---|
| JP | 2013-091256 A | 5/2013 |
| JP | 2014-027366 A | 2/2014 |

(Continued)

*Primary Examiner* — Anh-Vinh Thi Nguyen
(74) *Attorney, Agent, or Firm* — Burr & Brown, PLLC

(57) ABSTRACT

A document scanner includes a casing and a document cover disposed above the casing. The casing includes a document glass and houses an image scanner. The document cover has one end portion and the other end portion opposite to the first end portion in a first direction and is configured to pivotally move about the one end portion between a closed position in which the other end portion covers the document glass and an open position in which the other end portion uncovers the document glass. The other end portion has an end surface that intersects, when the document cover is at the closed position, with an upper surface of the document glass. The end surface has an indication indicating a location to which an external device is to be brought into proximity to establish short-range wireless communication between the document scanner and the external device.

9 Claims, 8 Drawing Sheets

(56) References Cited

U.S. PATENT DOCUMENTS

| | | | |
|---|---|---|---|
| 2005/0231639 A1* | 10/2005 | Kubota | H04N 1/32657 348/552 |
| 2008/0084575 A1* | 4/2008 | Dantwala | H04N 1/00464 358/1.15 |
| 2009/0190165 A1* | 7/2009 | Yoshida | H04N 1/00344 358/1.15 |
| 2010/0064363 A1* | 3/2010 | Kano | G06F 21/608 726/19 |
| 2012/0154851 A1* | 6/2012 | Rothery | G06F 1/1626 358/1.15 |
| 2012/0200874 A1* | 8/2012 | Kohara | H04N 1/00408 358/1.12 |
| 2012/0320418 A1* | 12/2012 | Saka | H04N 1/00474 358/1.15 |
| 2013/0021638 A1* | 1/2013 | Hong | G06F 3/1232 358/1.14 |
| 2013/0141758 A1* | 6/2013 | Yoneda | G03G 15/5066 358/1.15 |
| 2013/0148149 A1* | 6/2013 | Park | G06F 3/1292 358/1.13 |
| 2013/0184845 A1* | 7/2013 | Hales | G05B 19/41865 700/97 |
| 2013/0229685 A1* | 9/2013 | Naruse | G06F 3/1292 358/1.15 |
| 2013/0231051 A1* | 9/2013 | Naruse | G06F 3/126 455/41.2 |
| 2013/0235414 A1* | 9/2013 | Iwamoto | G06K 15/4005 358/1.14 |
| 2013/0235424 A1* | 9/2013 | Yamada | H04N 1/0049 358/1.15 |
| 2013/0286433 A1* | 10/2013 | Matsushima | H04N 1/00519 358/1.15 |
| 2013/0321840 A1* | 12/2013 | Yamamoto | G06K 15/1801 358/1.13 |
| 2014/0029050 A1 | 1/2014 | Chen | |
| 2014/0044010 A1* | 2/2014 | Hiroshige | H04W 24/02 370/254 |
| 2014/0078549 A1* | 3/2014 | Amiya | H04N 1/00973 358/1.15 |
| 2014/0146334 A1* | 5/2014 | Yuzawa | H04N 1/04 358/1.13 |
| 2014/0253949 A1* | 9/2014 | Tsujimoto | H04N 1/0084 358/1.14 |
| 2014/0292359 A1* | 10/2014 | Akagi | G06F 3/044 324/705 |
| 2014/0293980 A1* | 10/2014 | Shibata | H04W 4/008 370/338 |
| 2014/0300915 A1* | 10/2014 | Ishikura | G06F 3/128 358/1.13 |
| 2014/0340698 A1* | 11/2014 | Baba | H04B 5/0031 358/1.13 |
| 2015/0022855 A1* | 1/2015 | Nakamura | G06K 15/005 358/1.15 |
| 2015/0065037 A1* | 3/2015 | Burrell | H02J 7/025 455/41.1 |
| 2015/0138597 A1* | 5/2015 | Koshigaya | H04N 1/00132 358/1.15 |
| 2015/0222783 A1* | 8/2015 | Choi | G06K 19/145 235/375 |
| 2015/0327172 A1* | 11/2015 | Kusakabe | H04W 36/0022 370/331 |
| 2016/0049056 A1* | 2/2016 | Grant | G08B 13/2405 340/572.1 |
| 2016/0142575 A1* | 5/2016 | Yokoyama | H04W 4/80 358/1.15 |
| 2016/0191751 A1* | 6/2016 | Izumi | G06F 1/3212 358/1.13 |
| 2016/0224289 A1* | 8/2016 | Yamanaka | H04N 1/00411 |
| 2016/0227071 A1* | 8/2016 | Asakura | H04N 1/32496 |
| 2016/0247144 A1* | 8/2016 | Oh | G06Q 20/321 |
| 2016/0269573 A1* | 9/2016 | Sugita | H04N 1/32641 |
| 2017/0208195 A1* | 7/2017 | Yamamoto | H04N 1/04 |
| 2017/0246894 A1* | 8/2017 | Okazawa | H04N 1/00551 |
| 2017/0280010 A1* | 9/2017 | Mihira | H04W 4/80 |
| 2017/0310836 A1* | 10/2017 | Nakayama | H04N 1/00496 |
| 2018/0006746 A1* | 1/2018 | Yasuzaki | H04N 1/00307 |
| 2018/0183974 A1* | 6/2018 | Cao | G06F 3/1229 |
| 2018/0234563 A1* | 8/2018 | Ido | H04N 1/32683 |
| 2019/0041918 A1* | 2/2019 | Larsen | G06F 1/1635 |
| 2019/0070863 A1* | 3/2019 | Ho | B41J 2/362 |
| 2019/0130375 A1* | 5/2019 | Nakai | G06Q 20/3278 |
| 2019/0132815 A1* | 5/2019 | Zampini, II | G06Q 50/06 |
| 2019/0199867 A1* | 6/2019 | Okada | G06F 3/04886 |
| 2019/0212955 A1* | 7/2019 | Gutierrez | G06F 3/1208 |
| 2020/0080782 A1* | 3/2020 | Walker | G05B 19/042 |
| 2020/0097946 A1* | 3/2020 | Bian | A61K 31/485 |
| 2020/0112644 A1* | 4/2020 | Shingai | H04N 1/00994 |
| 2020/0285188 A1* | 9/2020 | Okamoto | G03G 21/1652 |
| 2020/0298574 A1* | 9/2020 | Takabayashi | B41J 29/13 |
| 2020/0389563 A1* | 12/2020 | Toda | H04W 4/80 |

FOREIGN PATENT DOCUMENTS

| | | |
|---|---|---|
| JP | 2015-115780 A | 6/2015 |
| JP | 2018-029222 A | 2/2018 |

\* cited by examiner

DOCUMENT SCANNER AND IMAGE FORMING APPARATUS

CROSS-REFERENCE TO RELATED APPLICATION

This application claims priority from Japanese Patent Application No. 2019-041817 filed on Mar. 7, 2019, the content of which is incorporated herein by reference in its entirety.

TECHNICAL FIELD

Aspects of the disclosure relate to a document scanner and an image forming apparatus including the document scanner.

BACKGROUND

A known image forming apparatus is configured to perform short-range wireless communication with an external device, such as an IC card and a smartphone, in compliance with, for example, a near field communication ("NFC") technology. The known image forming apparatus includes a document scanner including a document cover configured to open and close. The document cover has an NFC communication area on an upper surface thereof.

SUMMARY

A user may open the document cover with an external device left on the NFC communication area on the upper surface of the document cover. This may cause the external device to be fallen down to the floor.

One aspect of the disclosure provides a document scanner configured to execute short-range wireless communication and having a novel configuration. Another aspect of the disclosure provides an image forming apparatus including the document scanner.

According to an aspect of the disclosure, a document scanner comprises a casing and a document cover. The casing includes, at an upper surface thereof, a document glass configured to support a document. The casing houses an image scanner configured to scan an image on the document supported by the document glass. The document cover is disposed above the casing. The document cover has one end portion and the other end portion opposite to the first end portion in a first direction. The document cover is configured to pivotally move about the one end portion between a closed position in which the other end portion of the document cover covers the document glass and an open position in which the other end portion of the document cover uncovers the document glass. The other end portion of the document cover has an end surface that intersects, when the document cover is at the closed position, with an upper surface of the document glass. The end surface has an indication indicating a location to which an external device is to be brought into proximity to establish short-range wireless communication between the document scanner and the external device.

According to another aspect of the disclosure, an image forming apparatus comprises the document scanner and an image forming unit configured to form an image scanned by the document scanner on a sheet.

DETAILED DESCRIPTION

Figure 1:
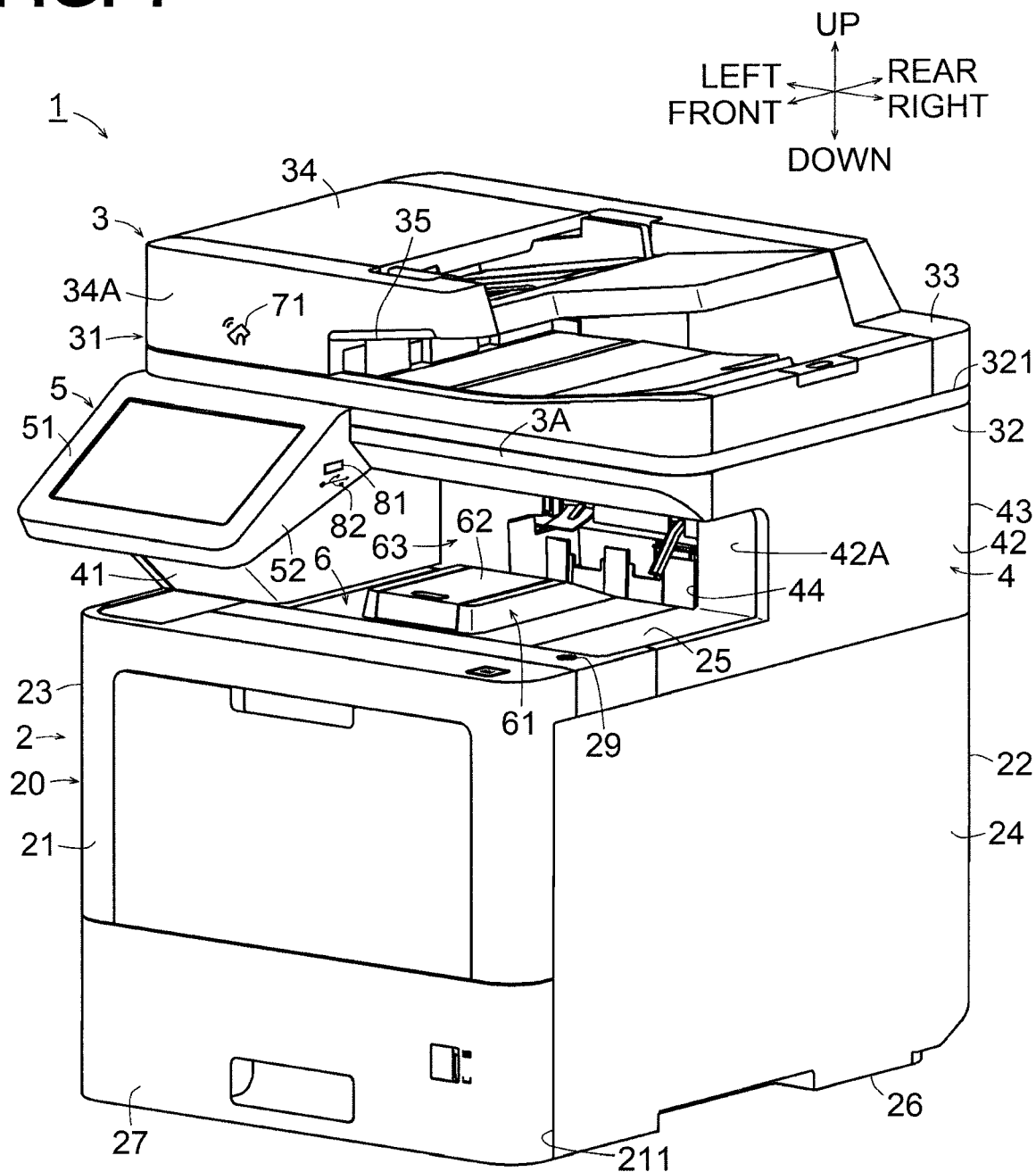
FIG. 1 is a perspective view of an image forming apparatus in an illustrative embodiment according to one or more aspects of the disclosure.

Respective directions of front, rear, left, right, top/upper, and bottom/lower are defined in conjunction with an orientation in which an image forming apparatus 1 is intended to be used, as depicted in FIG. 1. A side of the image forming apparatus 1 having a front surface 21 may be defined as a front side, and a side opposite to the front side may be defined as a rear side. A left side and a right side of the image forming apparatus 1 may be defined with respect to the image forming apparatus 1 as viewed from its front side. A side of the image forming apparatus 1 on which a second casing 3 is disposed is the upper side. A side of the image forming apparatus 1 on which a first casing 2 is disposed is the lower side. In the illustrative embodiment, the front-rear direction is an example of a first direction and the left-right direction is an example of a second direction and a width direction perpendicular to a discharging direction of a sheet by discharge rollers 28.

[Configuration of Image Forming Apparatus]

Figure 2:
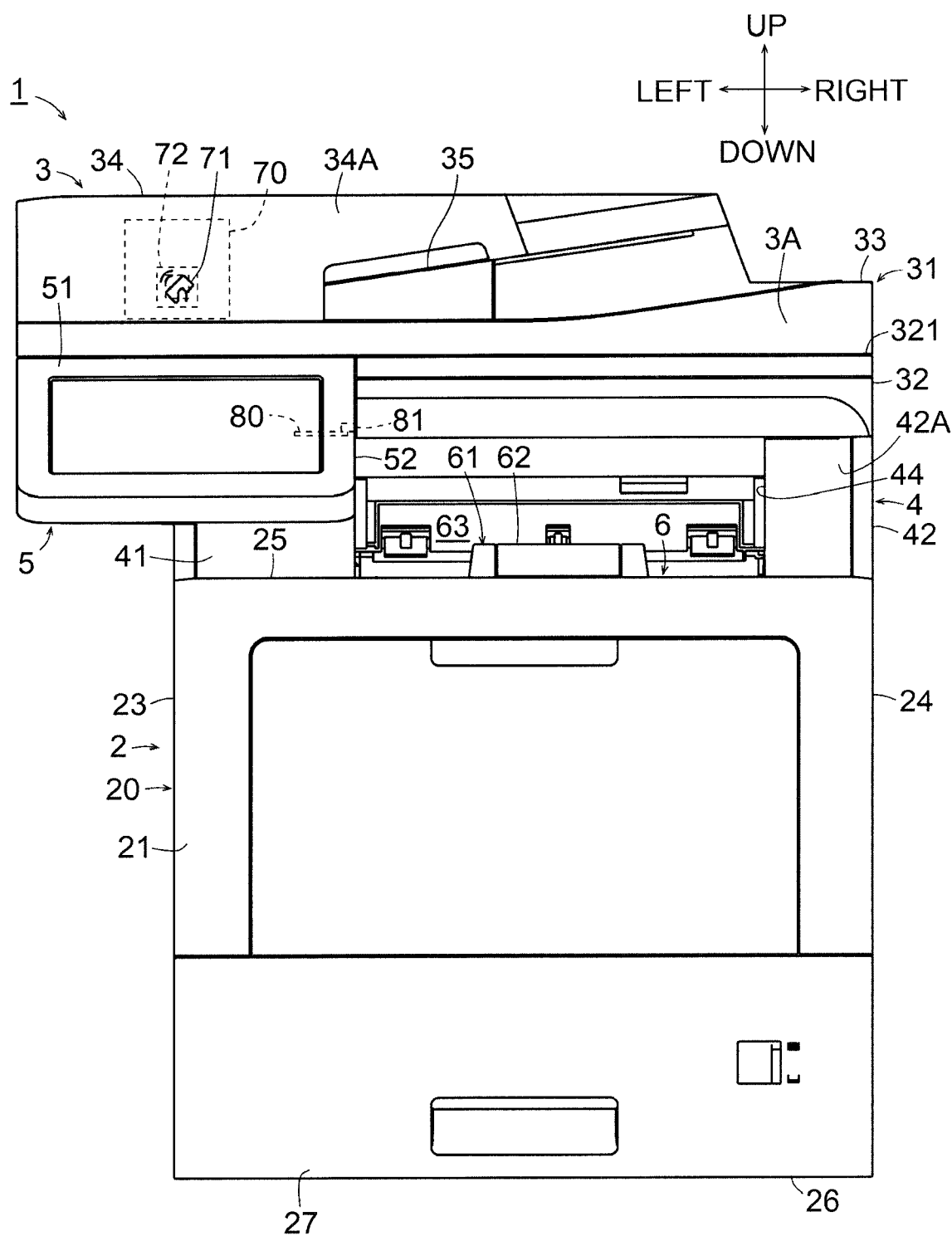
FIG. 2 is a front view of an image forming apparatus in an illustrative embodiment according to one or more aspects of the disclosure.
Figure 3:
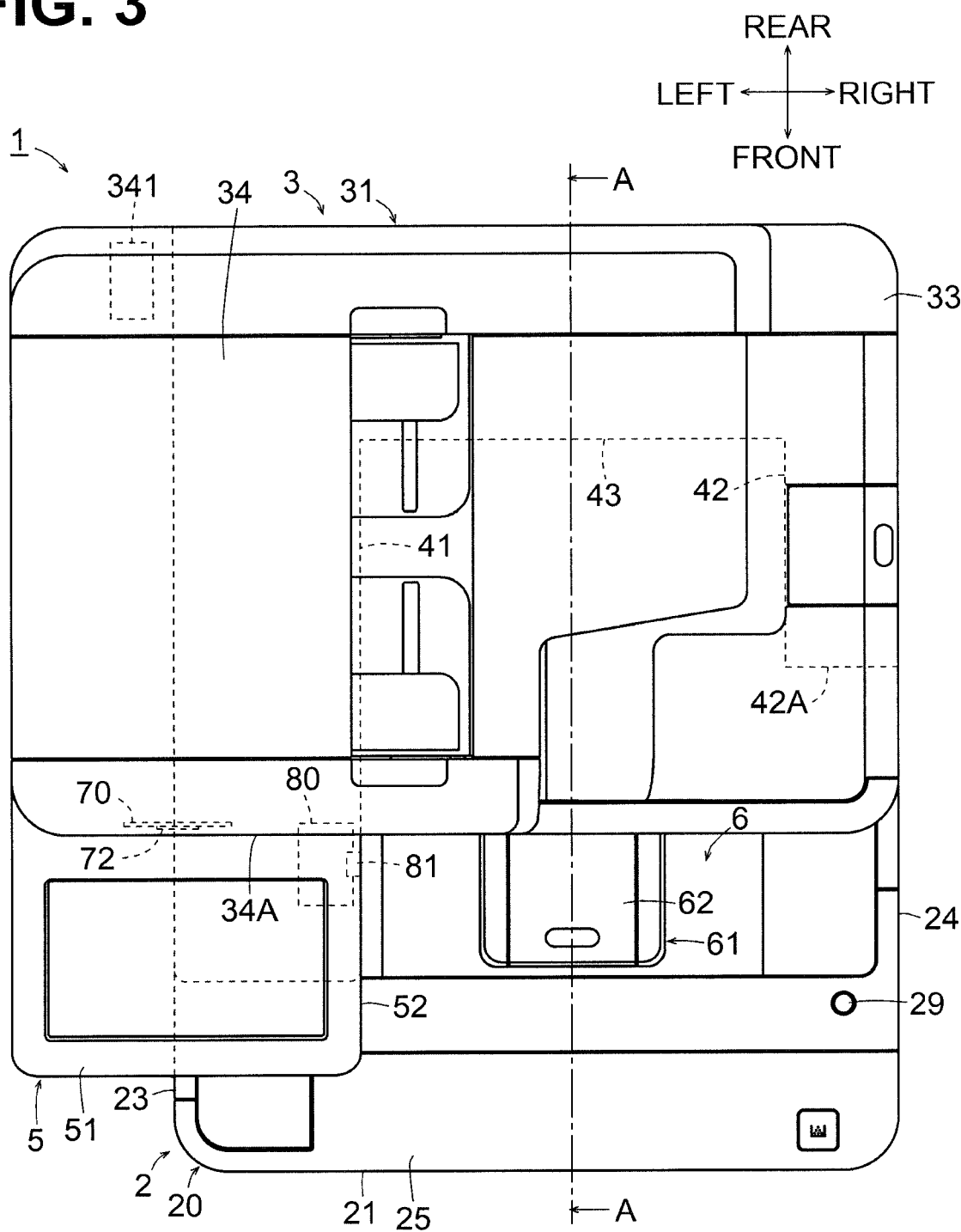
FIG. 3 is a top view of an image forming apparatus in an illustrative embodiment according to one or more aspects of the disclosure.
Figure 4:
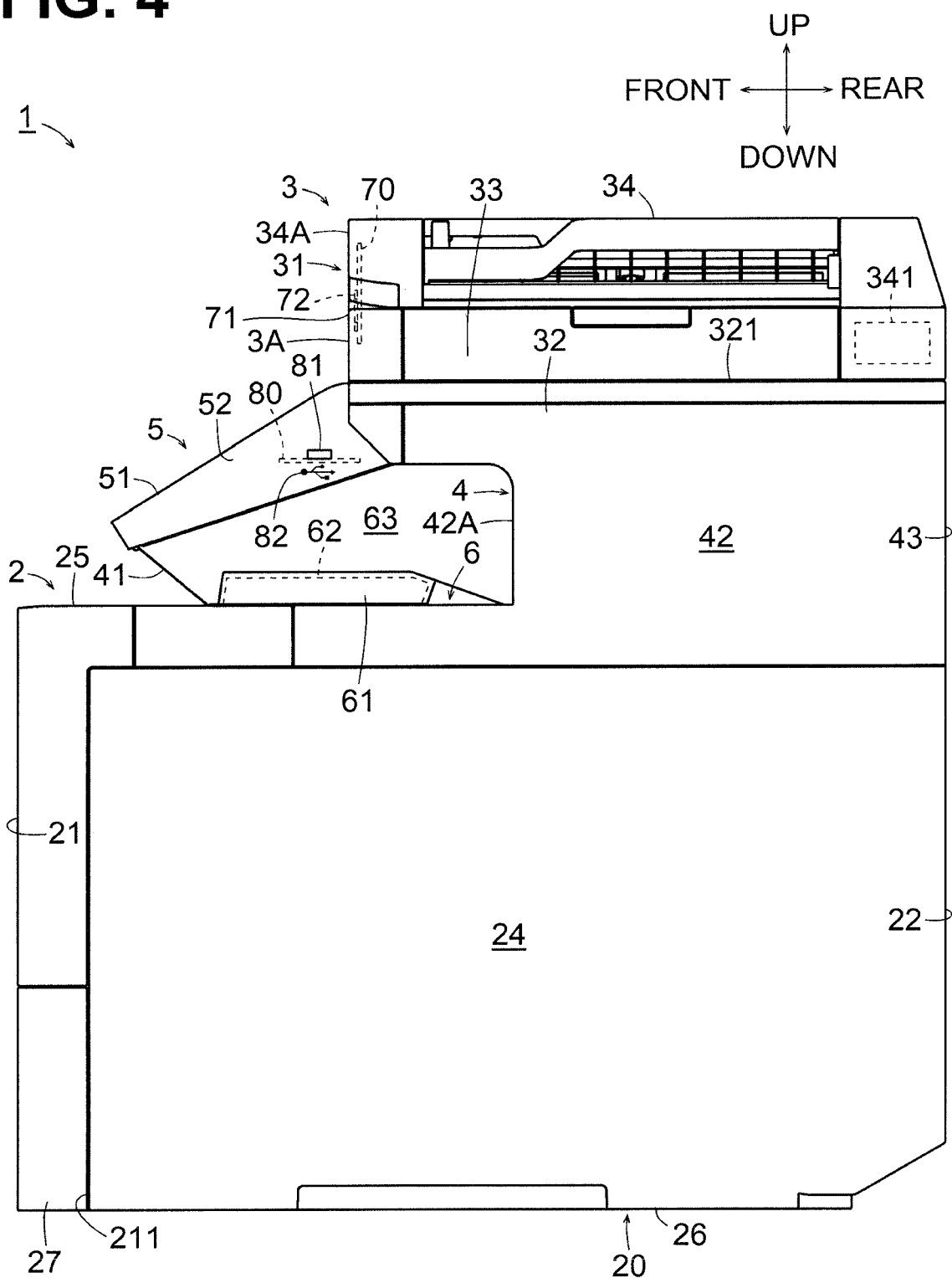
FIG. 4 is a right side view of an image forming apparatus in an illustrative embodiment according to one or more aspects of the disclosure.
Figure 5:
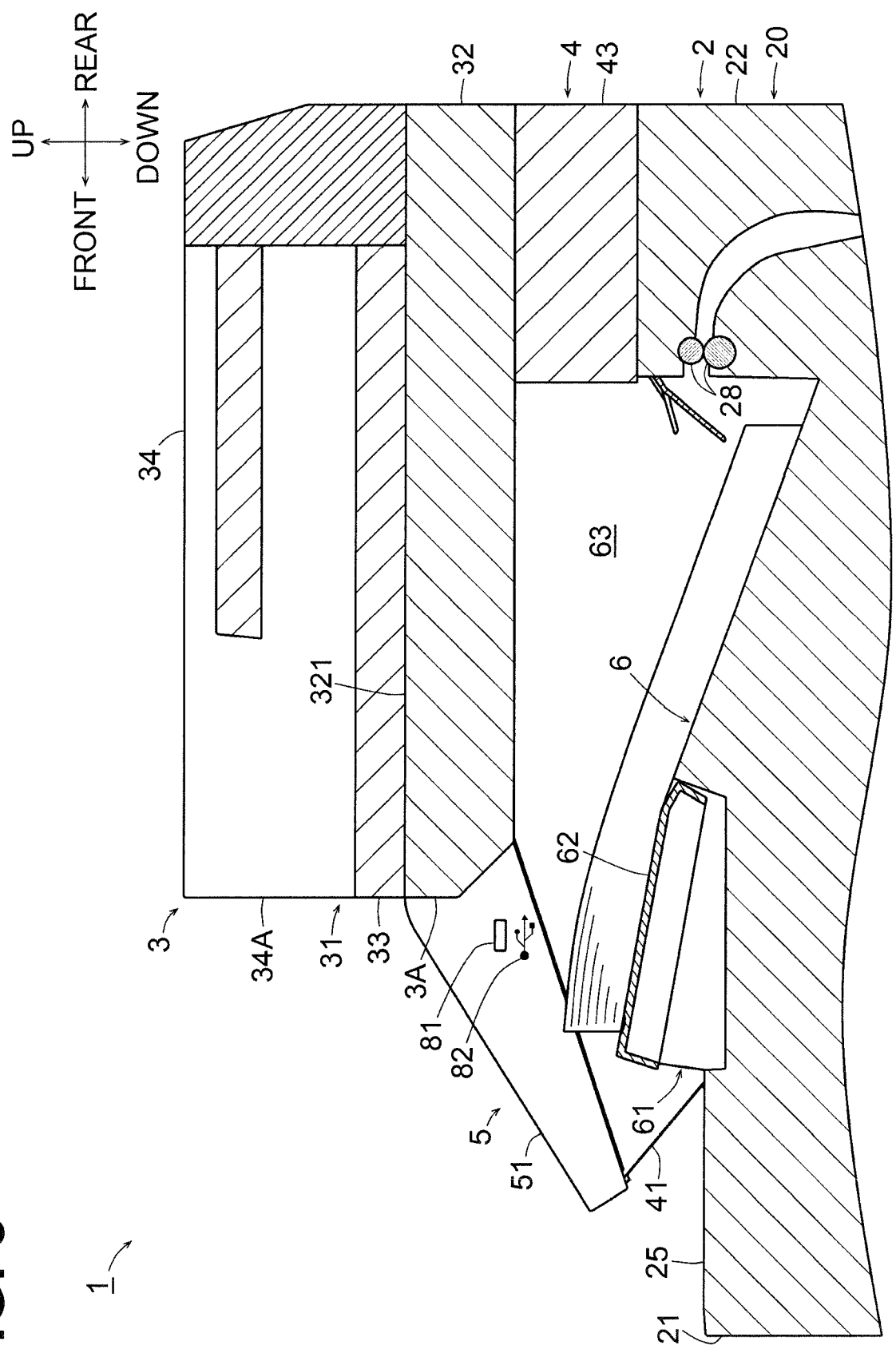
FIG. 5 is a cross-sectional view of the image forming apparatus of FIG. 3, taken along a line A-A, illustrating a discharged sheet stopper is in a use position.

FIG. 1 is a perspective view of the image forming apparatus 1 according to an illustrative embodiment. FIG. 2 is a front view of the image forming apparatus 1. FIG. 3 is a top view of the image forming apparatus 1. FIG. 4 is a right side view of the image forming apparatus 1. FIG. 5 is a cross-sectional view of the image forming apparatus 1, taken along a line A-A of FIG. 3, illustrating a discharged sheet stopper 62 is in a use position. The image forming apparatus 1 employs an interior sheet discharge system. The image forming apparatus 1 includes the first casing 2, the second casing 3, a support portion 4, and a control panel 5.

The first casing 2 includes a cover 20 having a generally rectangular parallelepiped shape. The cover 20 defines an appearance of the first casing 2. The cover 20 includes the front surface 21, a rear surface 22, a left surface 23, a right surface 24, a top surface 25, and a bottom surface 26. The cover 20 has an opening 211 at a lower portion of the front surface 21. Through the opening 211, a sheet tray 27 is attached or removed.

The first casing 2 houses the sheet tray 27 configured to support a stack of one or more sheets, a conveying mechanism configured to convey a sheet from the sheet tray 27, an image forming unit configured to form an image on the sheet conveyed by the conveying mechanism, a sheet discharge mechanism configured to discharge the sheet from the image forming unit to an exterior of the first casing 2. The sheet discharge mechanism includes the discharge rollers 28 disposed at a most downstream portion thereof in a sheet conveying direction (e.g., the sheet discharging direction).

The sheet tray 27 is configured to move in a front-rear direction between a fully attached position (as depicted in FIG. 1) and a separated position. At the fully attached position, the sheet tray 27 is fully attached to the first casing 2 through the opening 211. At the separated position, the sheet tray 27 is at least partially separated or removed from the first casing 2 toward the front through the opening 211. The image forming unit may form an image based on, but not limited to, an electrophotographic method, an inkjet method, or other method.

A sheet discharge tray 6 is located at the top surface 25 of the first casing 2. The sheet discharge tray 6 is configured to receive a sheet discharged by the sheet discharge mechanism. The sheet discharge tray 6 is formed on the top surface 25 of the first casing 2 into a convex shape curving upward from the rear side toward the front side. The sheet having an image formed thereon may be discharged by the sheet discharge mechanism in a rear-to-front direction onto the sheet discharge tray 6.

The sheet discharge tray 6 includes a protruding portion 61 disposed at a central portion thereof in the width direction, and the discharged sheet stopper 62 disposed at the protruding portion 61. The protruding portion 61 protrudes upward relative to other area of the sheet discharge tray 6. The protruding portion 61 has a trapezoidal shape whose rear portion is inclined downward. The discharged sheet stopper 62 has a generally rectangular plate shape. The discharged sheet stopper 62 has a rear end portion that is pivotally supported by the protruding portion 61. The discharged sheet stopper 62 is configured to move between an accommodated position (as depicted in FIG. 4) and a use position (as depicted in FIG. 5). At the accommodated position, the discharged sheet stopper 62 is flush with the upper end portion of the protruding portion 61. At the use position, a front end portion of the discharged sheet stopper 62 is raised. When the discharged sheet stopper 62 is in the use position, a sheet discharged onto the sheet discharge tray 6 may contact the discharged sheet stopper 62, so that the position of the sheet on the sheet discharge tray 6 may be regulated.

In a case where the sheet discharged on the sheet discharge tray 6 has curling ends, in the width direction, that curl upward, the protruding portion 61 raises and supports the central portion of the sheet in the width direction and may reduce the curling. When a stack of one or more sheets is supported on the sheet discharge tray 6, a space is provided below the stack near the protruding portion 61. The space may allow a user to hold the stack. The protruding portion 61 may not necessarily be provided but may be omitted.

The image forming apparatus 1 includes a power switch 29 disposed at the top surface 25 of the first casing 2. For easy recognition and operation, the power switch 29 may preferably be disposed at a portion of the top surface 25 of the first casing 2 further toward the front than the discharged sheet stopper 62 and outside an area of the sheet discharge tray 6 in the width direction. In the illustrative embodiment, the power switch 29 is located at a right front portion of the top surface 25.

The second casing 3 is disposed above the first casing 2 and includes a document scanner 31. The document scanner 31 includes a scanner casing 32. The scanner casing 32 includes a document glass 321 on an upper surface thereof. The document glass 321 is configured to support a document. The scanner casing 32 houses an image scanner configured to scan an image on the document supported by the document glass 321. The document scanner 31 further includes a document cover 33 disposed above the scanner casing 32. The document cover 33 is configured to pivotally move about a pivot axis provided at one end portion, e.g., a rear end portion, of the document cover 33 between a closed position and an open position. At the closed position, the other end portion, e.g., a front end portion, of the document cover 33 is pivotally moved down and the document cover 33 covers the document glass 321. At the open position, the front end portion of the document cover 33 is pivotally moved up and the document cover 33 uncovers the document glass 321.

The document cover 33 includes an auto document feeder ("ADF") 34 disposed at an upper portion thereof. The ADF 34 is configured to automatically feed a document to the document glass 321. The ADF 34 has a front end surface 34A having an opening extending therethrough in the front-rear direction, thereby defining a grip 35. A user may hold the grip 35 to move the document cover 33 between the closed position and the open position. When the ADF 34 is at the closed position, the front end surface 34A intersects with an upper surface of the document glass 321 at an angle. In illustrative embodiment, the angle is, for example, a right angle. The image forming apparatus 1 includes a motor 341 disposed at a rear end portion of the ADF 34. The motor 341 is a drive source for the ADF 34.

The support portion 4 includes a left support portion 41, a right support portion 42, and a rear support portion 43. The left support portion 41, the right support portion 42, and the rear support portion 43 are respectively disposed at a left end portion, a right end portion, and a rear end portion of the top surface 25 of the first casing 2, raising the second casing 3. The second casing 3 is disposed above the sheet discharge tray 6 via a discharge space 63 in which a sheet is discharged. The left support portion 41, the right support portion 42, the top surface 25 of the first casing 2, and a lower surface of the second casing 3 define an open portion 44 at a front side of the image forming apparatus 1. The discharge space 63 is open toward the front, via the open portion 44. A user can be accessible to a sheet discharged onto the sheet discharge tray 6 via the open portion 44.

In illustrative embodiment, the right support portion 42 includes a front end surface 42A that is located further to the rear than a front end surface 3A of the second casing 3. The configuration may allow a right portion of the discharge space 63 to open widely, allowing a user to take a stack of one or more sheets discharged on the sheet discharge tray 6 from the right side of the image forming apparatus 1.

The control panel 5 has a substantially rectangular parallelepiped shape. The control panel 5 has a dimension in the left-right direction shorter than the dimension of the second casing 3 in the left-right direction. In the illustrative embodiment, the control panel 5 has a dimension in the left-right direction equal to or less than a half of the dimension of the second casing 3 in the left-right direction. The control panel 5 extends frontward from the front end surface 3A of the second casing 3 such that a left end portion of the control panel 5 is flush with a left end portion of the second casing 3. The location of the control panel 5 is not limited to a particular location as long as the control panel 5 is disposed downstream of the discharge rollers 28 in the discharging direction. The control panel 5 is configured to enable operations of the image forming apparatus 1, e.g., the document scanner 31. The control panel 5 includes an upper surface 51 on which a display, such as an LCD panel, and an input device, such as a touchscreen and keys/buttons, configured to operate the image forming unit and the image scanner, are disposed.

[NFC]

As depicted in FIG. 2, the ADF 34 has an NFC indication 71 provided, e.g., printed, on the front end surface 34A. The NFC indication 71 indicates a location to which an external device (e.g., an IC card and a smartphone) having an NFC function is to be brought into proximity to establish a wireless communication between the image forming apparatus 1 and the external device. The size and the shape of the NFC indication 71 are not limited to a particular size and shape. The NFC indication 71 may be provided in a manner other than printing. For example, the NFC indication 71 may include translucent member. The translucent member may illuminate the NFC indication 71 with a light source (e.g., a light-emitting diode) disposed under the translucent member. Using the NFC indication 71 as a guide, a user may bring the external device into proximity to the NFC indication 71, thereby establishing a wireless communication between the external device and the image forming apparatus 1.

Since the NFC indication 71 is provided at the front end surface 34A of the ADF 34, a user needs to bring the external device into proximity to the NFC indication 71 while securely holding the external device by hand. This may prevent a user from opening the document cover 33 with an external device on the document scanner 31. The front end surface 34A, which is created or defined by the thickness of the ADF 34, may be effectively used for the NFC indication 71. Since the NFC indication 71 is disposed at an upper portion of the document scanner 31 closer to a user, the user may readily identify the NFC indication 71. The document scanner 31 having a novel configuration and the image forming apparatus 1 including the document scanner 31 may thus be provided.

The NFC indication 71 and the control panel 5 may be preferably located on a same side (e.g., a left side) of the image forming apparatus in the width direction. In other words, the NFC indication 71 and the control panel 5 may be located closer to one end (e.g., a left end) of the image forming apparatus 1 in the width direction than the other end (e.g., a right end) of the image forming apparatus 1 opposite to the one end in the width direction. To achieve such configuration, the ADF 34 on which the NFC indication 71 is provided needs to be disposed on the same side as the control panel 5 in the width direction. In other words, the ADF 34 needs to be located closer to the one end of the image forming apparatus 1 in the width direction than the other end of the image forming apparatus 1 in the width direction. In the illustrative embodiment, the ADF 34 and the control panel 5 is located on the left side of the image forming apparatus 1. The NFC indication 71 is also located on the left side of the image forming apparatus 1 and is provided at a position overlapping with the control panel 5 in the left-right direction.

The NFC indication 71 and the control panel 5 are both located closer to the one end (e.g., the left end) of the image forming apparatus 1 in the width direction than the other end (e.g., the right end) of the image forming apparatus 1 in the width direction. This configuration may allow a user to readily identify both the NFC indication 71 and the control panel 5 by looking in one direction.

An NFC board 70 is located, facing the NFC indication 71, inside the ADF 34, to establish a favorable wireless communication between the image forming apparatus 1 and the external device. In the illustrative embodiment, the NFC board 70 is disposed behind the NFC indication 71 along an inner surface (e.g., a rear surface) of the front end surface 34A of the ADF 34. The NFC board 70 is a circuit board having a generally rectangular shape. The NFC board 70 includes a loop antenna 72 and circuits, such as a communication circuit and a detection circuit.

The loop antenna 72 is disposed on a front surface of the NFC board 70 such that the loop antenna 72 is located behind the NFC indication 71. The loop antenna 72 is configured to transmit to or receive from an external device, radio waves for NFC communication. The communication circuit is configured to process the radio waves transmitted to or received from the external device into signals. The detection circuit is configured to detect a current that flows in the loop antenna 72, thereby detecting intensities of the radio waves transmitted or received by the loop antenna 72.

In the illustrative embodiment, the NFC indication 71 and the NFC board 70 are disposed at a front end portion of the ADF 34 and the motor 341 is disposed at a rear end portion of the ADF 34. The motor 341 is disposed opposite to the NFC indication 71 and the NFC board 70 in the front-rear direction. This configuration may prevent or reduce degradation of communication performance between the image forming apparatus 1 and an external device, due to noises of the motor 341.

[USB]

As depicted in FIG. 4, the image forming apparatus 1 includes a USB port 81 to which a terminal of a USB device, such as a USB memory and a digital camera, is connectable. The USB port 81 is located at a side surface of the control panel 5 closer to the center of the image forming apparatus 1 in the width direction. In the illustrative embodiment, the USB port 81 is located at a right surface 52 of the control panel 5. The USB port 81 may be located at any portion of the right surface 52 of the control panel 5. The control panel 5 has a USB indication 82 provided, e.g., printed, at a portion of the right surface 52 near the USB port 81. The USB indication 82 or the USB port 81 may help a user to recognize the location of the USB port 81.

Since the USB port 81 is located at a side surface of the control panel 5 closer to the center of the image forming apparatus 1 in the width direction, a USB device inserted into the USB port 81 may not stick out relative to a surface (e.g., a right surface) of the first casing 2 when viewed from the top. This configuration may reduce risks of damaging the USB device as a user hits the USB device. In addition, this configuration may ensure a space for attaching and removing the USB device. Since the USB port 81 is disposed above the sheet discharge tray 6, a user may visually identify the USB port 81 readily. Further, a user may readily identify both the control panel 5 and the USB port 81 by looking in one direction.

The USB port 81 at a side surface of the control panel 5 may enhance visibility of the USB port 81 and operability of the control panel 5 at the same time. In addition, a USB device inserted into the USB port 81 may not cover the NFC indication 71, which may ensure visibility of the NFC indication 71 even when the USB device is inserted into the USB port 81.

A USB board 80 is located inside the control panel 5. The USB board 80 is a circuit board having a generally rectangular shape. The USB board 80 includes the USB port 81 and circuits. The USB port 81 is disposed on an upper surface of the USB board 80 and protrudes rightward.

[First Modification]

Figure 6:
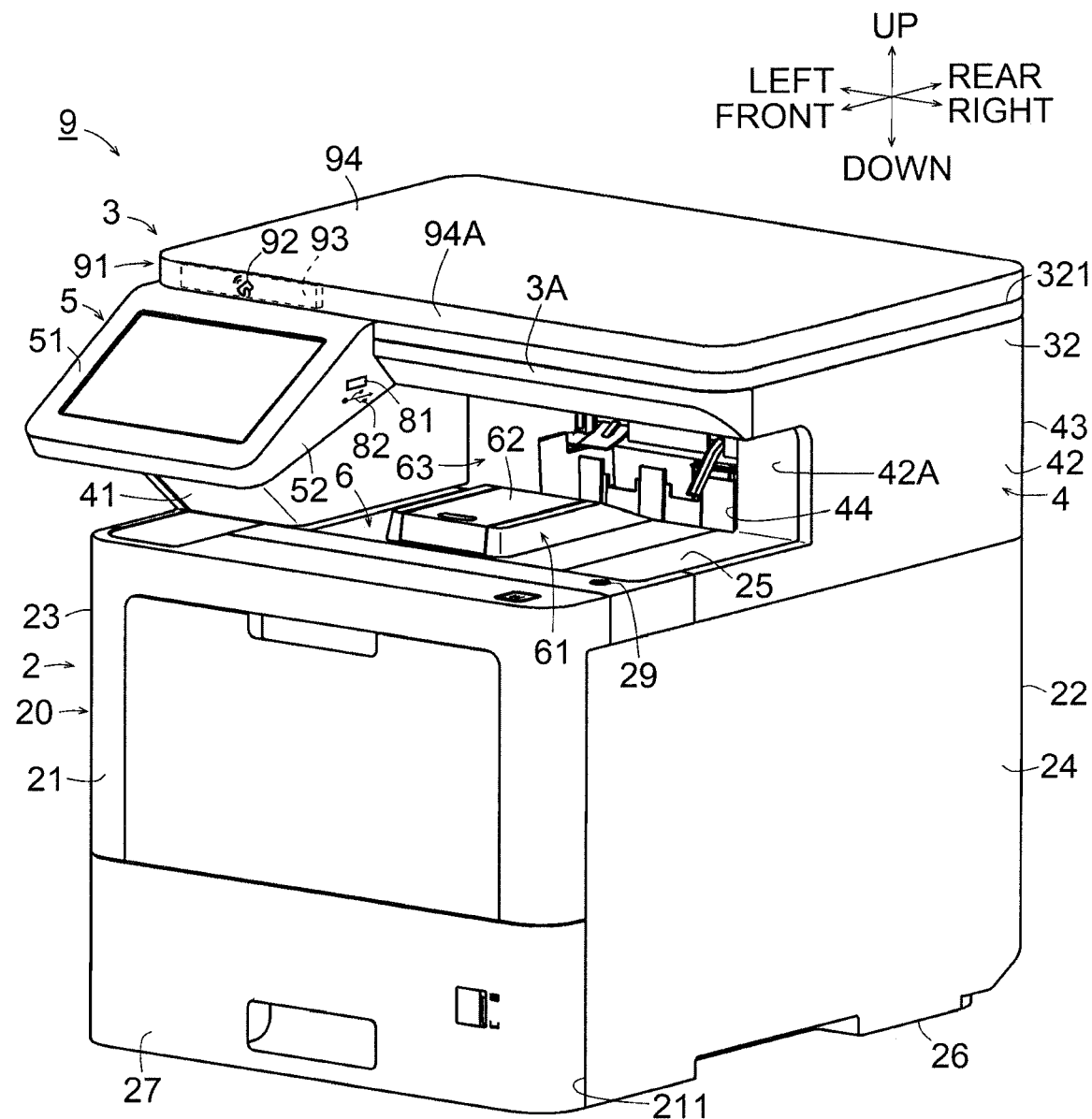
FIG. 6 is a perspective view of an image forming apparatus in a first modification according to one or more aspects of the disclosure.

FIG. 6 is a perspective view of an image forming apparatus 9 according to a first modification. The image forming apparatus 9 according to the first modification is different from the image forming apparatus 1 with respect to a document scanner 91, which does not include an ADF, and positions of an NFC indication 92 and an NFC board 93. Except for the document scanner 91 and the positions of the NFC indication 92 and the NFC board 93, the image forming apparatus 9 has the same or similar configuration as the image forming apparatus 1. Like numerals in the drawings denote like components and the detailed description of those components described above is omitted, with respect to FIGS. 6-8.

The document scanner 91 includes a document cover 94 having a plate shape, which may be obtained by removing the ADF 34 from the document cover 33. The document cover 94 has a front end surface 94A. When the document cover 94 is at the closed position, the front end surface 94A intersects with the upper surface of the document glass 321 at an angle. In the first modification, the angle is, for example, a right angle.

The NFC indication 92 is located at a position that satisfies the same condition as the position of the NFC indication 71. In FIG. 6, the NFC indication 92 is provided at a portion of the front end surface 94A of the document cover 94 above the control panel 5. The NFC board 93 is similar to the NFC board 70 and has a thickness corresponding the thickness of the document cover 94. The NFC board 93 is located inside the document cover 94, facing the NFC indication 92.

In such configuration in which the document scanner 91 does not include an ADF and the NFC indication 91 is provided at the front end surface 94A of the document cover 94, effects similar to those of the image forming apparatus 1 may be obtained.

[Second Modification]

Figure 7:
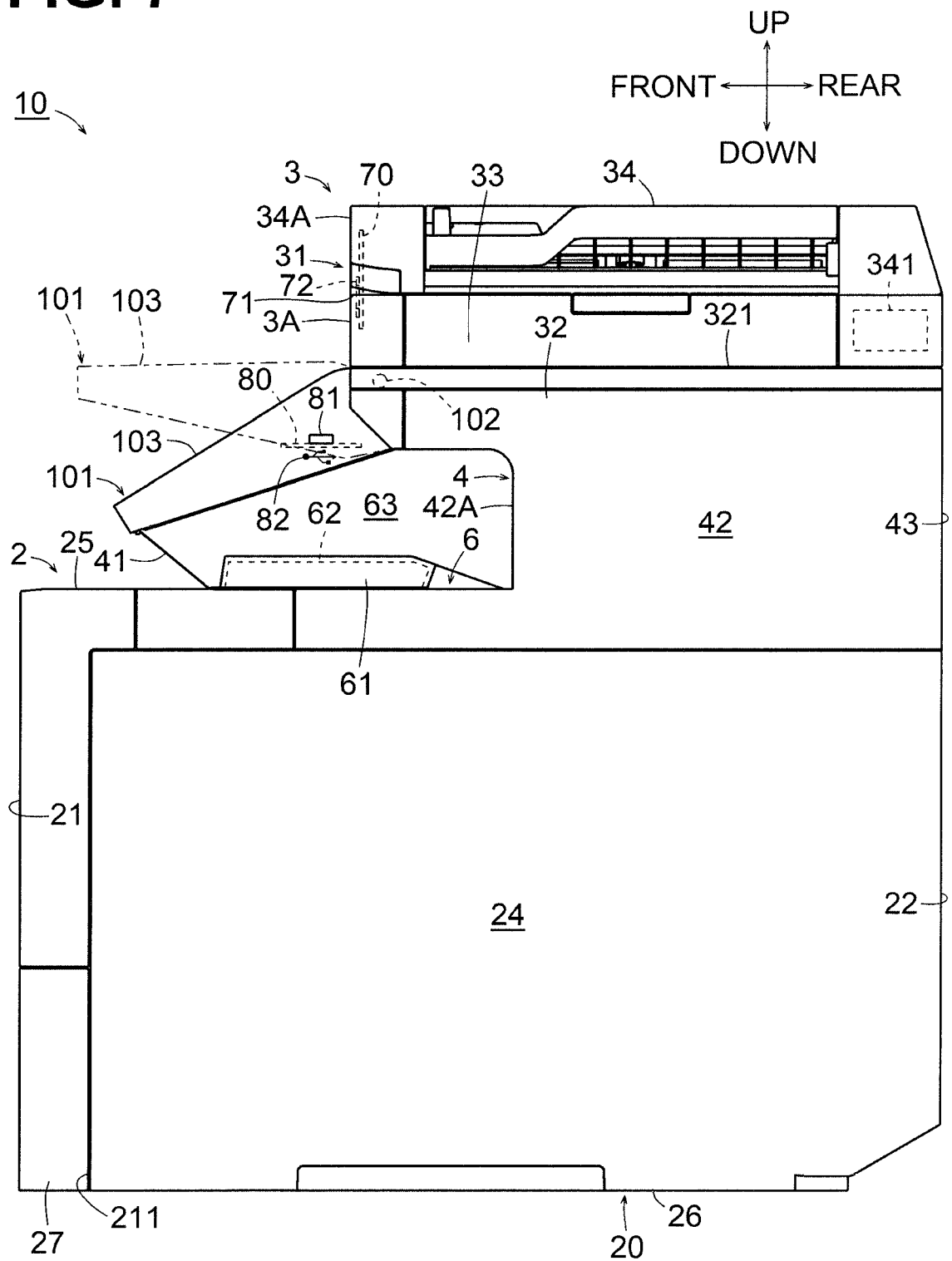
FIG. 7 is a right side view of an image forming apparatus in a second modification according to one or more aspects of the disclosure.

FIG. 7 is a right side view of an image forming apparatus 10 according to a second modification. The image forming apparatus 10 according to the second modification is different from the image forming apparatus 1 with respect to a pivotable control panel 101. Except for the pivotable control panel 101, the image forming apparatus 10 has the same or similar configuration as the image forming apparatus 1.

The control panel 101 includes a pivot shaft 102 disposed at a rear end portion of the control panel 101. The pivot shaft 102 extends in the left-right direction. The pivot shaft 102 is pivotally supported by a recess portion provided in the second casing 3. This configuration may allow the control panel 101 to pivotally move about the pivot shaft 102 between an inclined position (as depicted by a solid line in FIG. 7) and a horizontal position (as depicted by a phantom line in FIG. 7). At the inclined position, a front portion of an upper surface 103 of the control panel 101 is lower than a rear portion of the upper surface 103. At the horizontal position, the upper surface 103 is horizontal. In other words, an angle of the control panel 101 relative to the NFC indication 71 is changeable.

Configuration of the second modification may allow a user to adjust an angle of the control panel 101 as desired, and to see the NFC indication 71 and the control panel 101 both at a glance. If the control panel 101 and the NFC indication 71 are close to each other, the control panel 101 may be moved to, for example, the inclined position, thereby preventing or reducing interference between the control panel 101 and an external device brought into proximity to the NFC indication 71. This may lead to increased operability.

[Third Modification]

Figure 8:
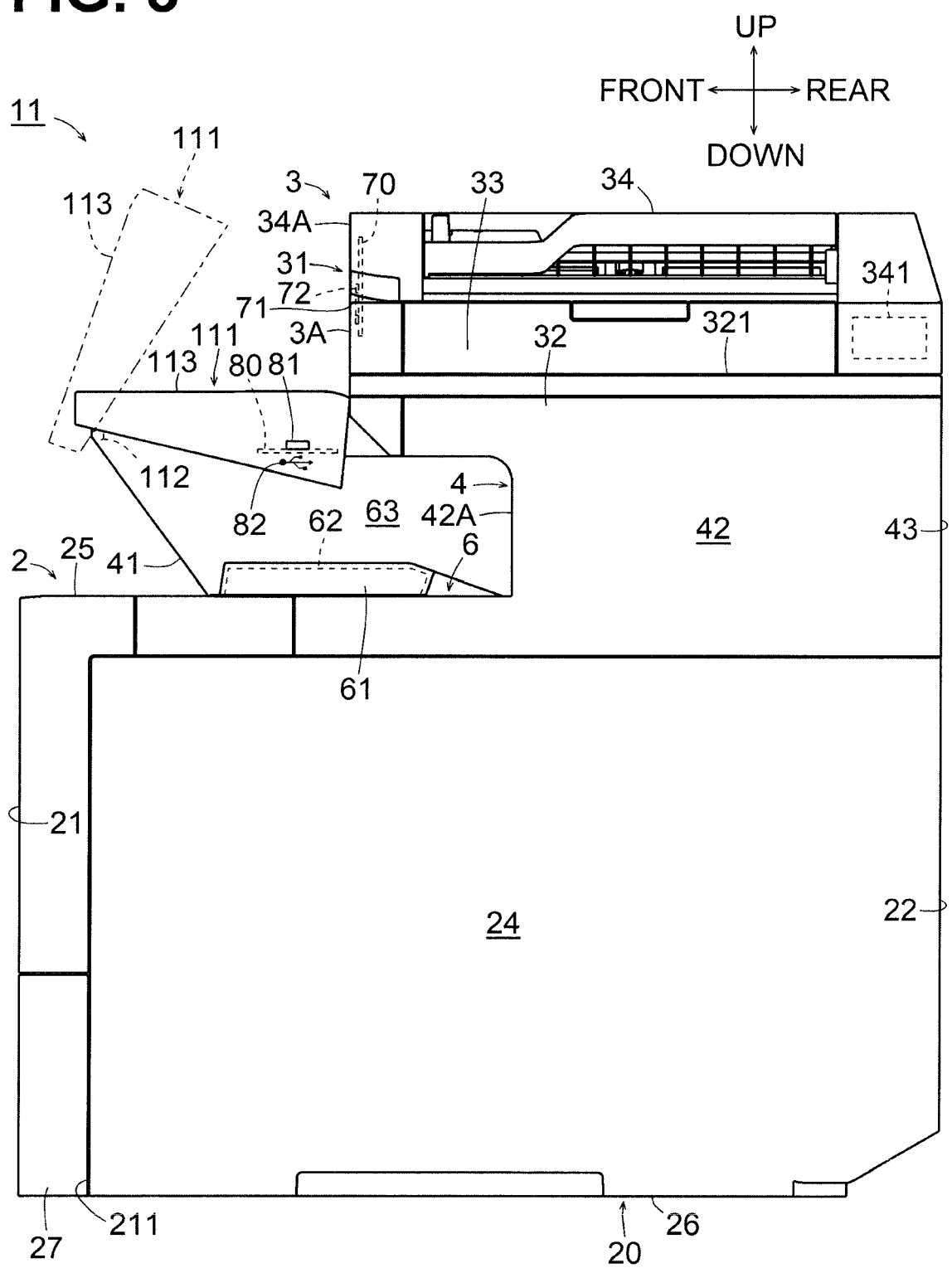
FIG. 8 is a right side view of an image forming apparatus in a third modification according to one or more aspects of the disclosure.

FIG. 8 is a right side view of an image forming apparatus 11 according to a third modification. The image forming apparatus 11 according to the third modification is different from the image forming apparatus 1 with respect to a pivotable control panel 111. Except for the pivotable control panel 111, the image forming apparatus 11 has the same or similar configuration as the image forming apparatus 1.

The control panel 111 includes a pivot shaft 112 disposed at a front end portion of a bottom surface of the control panel 111. The pivot shaft 112 extends in the left-right direction. The pivot shaft 112 is pivotally supported by a recess portion provided in the left support portion 41. This configuration may allow the control panel 111 to pivotally move about the pivot shaft 112 between a horizontal position (as depicted by a solid line in FIG. 8) and an inclined position (as depicted by a phantom line in FIG. 8). At the horizontal position, an upper surface 113 of the control panel 111 is horizontal. At the inclined position, a front portion of the upper surface 113 is lower than a rear portion of the upper surface 113. In other words, an angle of the control panel 111 relative to the NFC indication 71 is changeable.

Configuration of the third modification may allow a user to adjust the position of the control panel 111, as desired, for example, to the horizontal position, and to see the NFC indication 71 and the control panel 111 both at a glance. If the control panel 111 and the NFC indication 71 are close to each other, the control panel 111 may be moved to, for example, the inclined position, thereby preventing or reducing interference between the control panel 111 and an external device brought into proximity to the NFC indication 71. This may lead to increased operability.

What is claimed is:

1. A document scanner, comprising:
   a casing including, at an upper surface thereof, a document glass configured to support a document, the casing housing an image scanner configured to scan an image on the document supported by the document glass;
   a document cover disposed above the casing, the document cover having one end portion and the other end portion opposite to the first end portion in a first direction and configured to pivotally move about the one end portion between a closed position in which the other end portion of the document cover covers the document glass and an open position in which the other end portion of the document cover uncovers the document glass, the other end portion of the document cover having an end surface that intersects, when the document cover is at the closed position, with an upper surface of the document glass, the end surface having an indication indicating a location to which an external device is to be brought into proximity to establish short-range wireless communication between the document scanner and the external device;
   a control panel configured to enable an operation of the document scanner, the control panel being disposed closer to one end of the document glass in a second direction perpendicular to the first direction and parallel to the document glass than the other end of the document glass opposite to the end in the second direction; and
   a USB port disposed on a side surface of the control panel closer to a center of the casing in the second direction, wherein the indication of the document cover is disposed at a position higher than the control panel and at a position overlapping with the control panel in the second direction, and wherein the indication of the document cover faces in the first direction, and the USB port of the control panel faces in the second direction.

2. The document scanner according to claim 1, wherein the document cover includes an auto document feeder configured to automatically feed the document to the document glass, and wherein the auto document feeder includes the end surface.

3. The document scanner according to claim 2, wherein the auto document feeder is disposed closer to the one end of the document glass in the second direction than the other end of the document glass in the second direction.

4. The document scanner according to claim 3, wherein an angle of the control panel relative to the indication is changeable.

5. The document scanner according to claim 2, wherein the auto document feeder includes a motor disposed at the one end portion of the document cover in the first direction.

6. The document scanner according to claim 1, further comprising a circuit board that enables the short-range wireless communication, the circuit board located, facing the indication, inside the document cover.

7. The document scanner according to claim 6, wherein the document cover includes a grip disposed at the other end portion of the document cover, and wherein the circuit board is located at a position overlapping with the grip when viewed from a second direction perpendicular to the first direction and parallel to the document glass.

8. The document scanner according to claim 1, wherein the document cover includes a grip disposed at the other end portion of the document cover, and wherein the indication is located at a different position in a second direction perpendicular to the first direction and parallel to the document glass from the grip.

9. An image forming apparatus, comprising:
the document scanner according to claim 1; and
an image forming unit configured to form an image scanned by the document scanner on a sheet.

* * * * *

UNITED STATES PATENT AND TRADEMARK OFFICE
CERTIFICATE OF CORRECTION

PATENT NO. : 11,252,292 B2
APPLICATION NO. : 16/795659
DATED : February 15, 2022
INVENTOR(S) : Atsushi Hayakawa It is certified that error appears in the above-identified patent and that said Letters Patent is hereby corrected as shown below:

On the Title Page

Item (57), Abstract, Line 4:
Please change: "one end portion and the other end portion opposite to the first" to -- one end portion and the other end portion opposite to the one --

In the Claims

Claim 1, Column 8, Line 45:
Please change: "portion opposite to the first end portion in a first" to -- portion opposite to the one end portion in a first --

Claim 1, Column 8, Lines 63-64:
Please change: "to the document glass than the other end of the document glass opposite to the end in the second direction;" to -- to the document glass than the other end of the document glass opposite to the one end in the second direction; --

Claim 7, Column 10, Lines 8-9:
Please change: "wherein the circuit board is located at a position overlapping with the grip when viewed from a second direction" to -- wherein the circuit board is located at a position overlapping with the grip when viewed from the second direction --

Claim 8, Column 10, Line 16:
Please change: "a second direction perpendicular to the first direction" -- the second direction perpendicular to the first direction --

Signed and Sealed this
Fifteenth Day of November, 2022

Katherine Kelly Vidal
*Director of the United States Patent and Trademark Office*